(12) United States Patent
Foussard et al.

(10) Patent No.: US 9,104,530 B2
(45) Date of Patent: Aug. 11, 2015

(54) METHOD FOR ESTIMATING THE INITIAL TEMPERATURE OF A MECHANICAL MEMBER OF A VEHICLE AT THE START-UP OF THE VEHICLE

(75) Inventors: Francois Foussard, Versailles (FR); Stephane Guegan, Versailles (FR); Nicolas Romani, Paris (FR); Philippe Saint Loup, Jouars Pontchartrain (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 244 days.

(21) Appl. No.: 13/639,943

(22) PCT Filed: Apr. 7, 2011

(86) PCT No.: PCT/FR2011/050793
§ 371 (c)(1),
(2), (4) Date: Jan. 16, 2013

(87) PCT Pub. No.: WO2011/124860
PCT Pub. Date: Oct. 13, 2011

(65) Prior Publication Data
US 2013/0110312 A1 May 2, 2013

(30) Foreign Application Priority Data
Apr. 8, 2010 (FR) ...................................... 10 52663

(51) Int. Cl.
*B60W 40/12* (2012.01)
*G06F 17/00* (2006.01)

(52) U.S. Cl.
CPC .............. *G06F 17/00* (2013.01); *B60W 40/12* (2013.01); *B60W 2510/0676* (2013.01); *B60W 2550/12* (2013.01); *F02D 2200/021* (2013.01); *F02D 2200/0414* (2013.01)

(58) Field of Classification Search
CPC ................. B60W 2510/0676; B60W 2550/12; B60W 40/12; F02D 2200/021
USPC ............................................................ 701/1
See application file for complete search history.

(56) References Cited

U.S. PATENT DOCUMENTS

| 2002/0134350 | A1* | 9/2002 | Takano et al. ................. 123/349 |
| 2009/0182489 | A1* | 7/2009 | Yang et al. ..................... 701/113 |
| 2010/0222987 | A1 | 9/2010 | Recouvreur et al. |
| 2011/0288701 | A1* | 11/2011 | Chen .............................. 701/22 |

FOREIGN PATENT DOCUMENTS

FR 2 921 155 3/2009

OTHER PUBLICATIONS

French Search Report Issued Oct. 27, 2010 in Application No. FR 1052663 Filed Apr. 8, 2010.
International Search Report Issued Aug. 10, 2011 in PCT/FR11/050793 Filed Apr. 7, 2011.

* cited by examiner

*Primary Examiner* — Fadey Jabr
*Assistant Examiner* — Yazan A Soofi
(74) *Attorney, Agent, or Firm* — Oblon, McClelland, Maier & Neustadt, L.L.P.

(57) ABSTRACT

A system estimating temperature of a mechanical member of a vehicle once the vehicle has stopped, including: a temperature sensor of a first element of the vehicle, for example a fluid tank; a mechanism estimating air temperature outside the vehicle; a first module estimating temperature of the member when the vehicle is moving; a mechanism storing, while the vehicle is stopped, an outside air temperature, a temperature of the first element, and a temperature of the member; a second module to calculate how long the vehicle has been stopped according to the outside air temperature, the stored temperature of the first element, and the measured temperature of the first element; and a third module to calculate thermal history of temperature variation of the member while the vehicle is stopped, according to the outside air temperature, the stored temperature of the member, and the stoppage time of the vehicle.

14 Claims, 3 Drawing Sheets

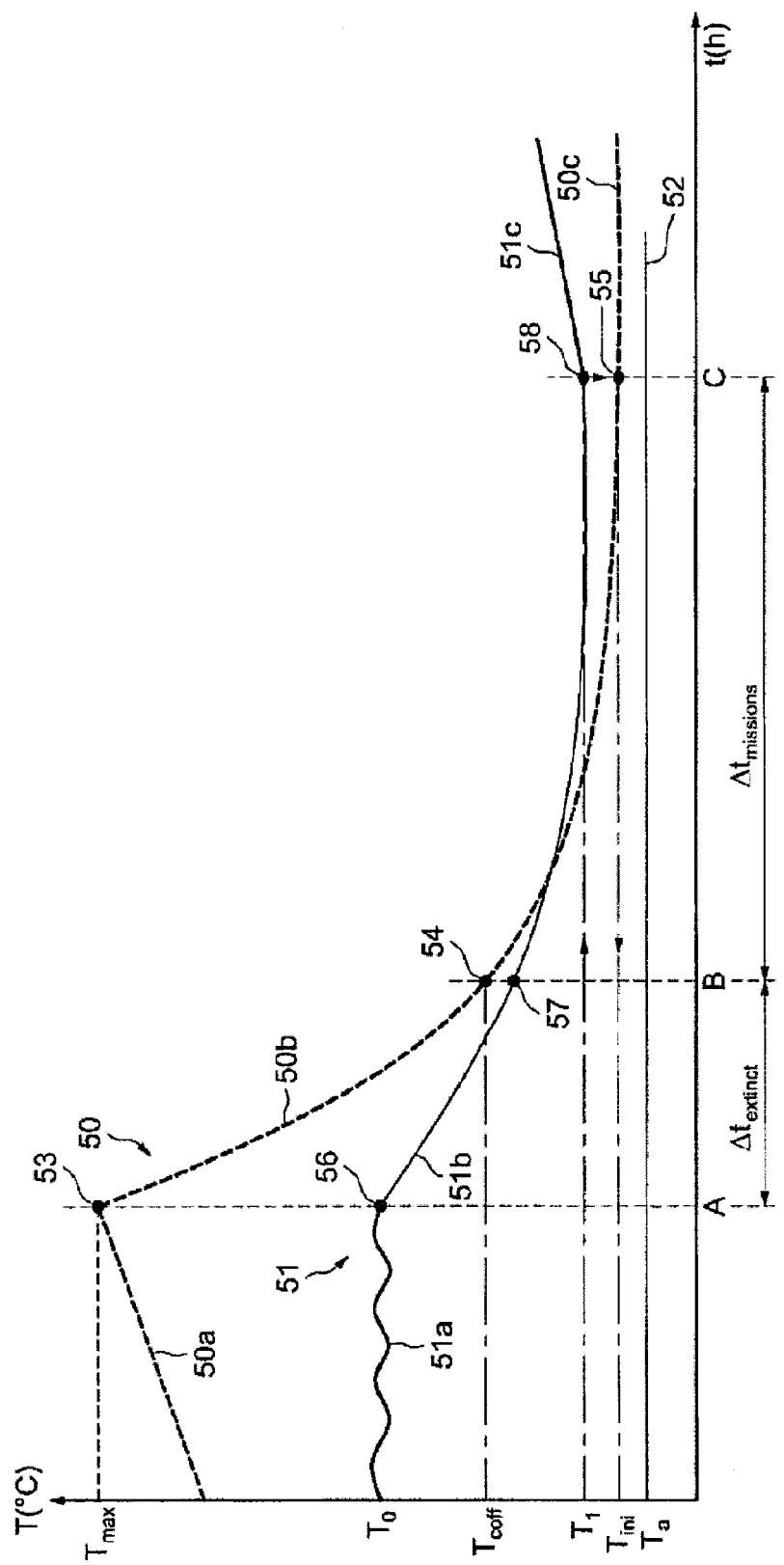

METHOD FOR ESTIMATING THE INITIAL TEMPERATURE OF A MECHANICAL MEMBER OF A VEHICLE AT THE START-UP OF THE VEHICLE

BACKGROUND

1. Field of the Invention

The invention lies in the field of monitoring the temperature of the mechanical members of a vehicle driven by an internal combustion engine. While the vehicle is traveling, in order to estimate the temperature of a mechanical member, generally the thermal energy dissipated by friction in this member is calculated, as well as the thermal energy given up by this member to the surrounding environment, i.e. to the air flowing under the engine cowling or under the vehicle. In the case of four-wheel drive vehicles, it is, for example, necessary to know the temperature of the coupler which transmits the available engine torque from one set of wheels of the vehicle to the other set of wheels of the vehicle.

2. Description of Related Art

Patent application EP 1 308 336 describes a method of managing a coupler according to the heating of the coupler. However, this document provides for assessing the heating of the coupler, either in terms of temperature difference with respect to an initial state, or in terms of thermal energy produced by friction. This document does not therefore provide a method for calculating the absolute temperature of the coupler. This temperature can be a crucial parameter, if, for example, the outside temperature is itself high, or if the coupler is already hot without this being taken into account by the system, following a start-up of the vehicle after a not very prolonged stop has not allowed the coupler to cool to the ambient temperature. For reducing the manufacturing costs and maintenance costs of the vehicle, the number of temperature sensors installed on the vehicle is limited to the minimum necessary. The monitoring methods developed should therefore preferably be able to forego having a temperature sensor on the member to be monitored (e.g. a coupler).

Incidentally, the monitoring methods developed will use, or preferably will not use a temperature sensor for the air outside the vehicle. Finally, for saving manufacturing costs and energy consumed by the vehicle, all the control electronics of the vehicle should be able to be switched off when the vehicle is at a prolonged stop. Thus solutions are sought that avoid maintaining an electronic clock on standby linked to the control system present. The moment the electronic control systems of the vehicle are powered up, they must therefore be capable of defining an initial value of temperature of the members from which they subsequently calculate the temperature variations by performing heat balances.

Using an arbitrary default value is risky since if the vehicle restarts after a short stoppage period, this default value risks being underestimated. There is a risk therefore of underestimating all the subsequently calculated temperatures of the coupler or of the member and damaging the member to be monitored.

BRIEF SUMMARY

The object of the invention is to provide a method for estimating an initial temperature of a dissipative vehicle member, enabling an initial temperature value to be assigned in the absence of temperature sensors on the member and in the absence of information, by a clock, from the time elapsed since the last use of the vehicle.

A system for estimating the temperature of a mechanical member of a vehicle after the vehicle is stopped, includes:
- a temperature sensor of a first element of the vehicle which may notably be a fluid tank of the vehicle;
- a means for estimating the air temperature outside the vehicle;
- a first module for estimating the temperature of the member while the vehicle is traveling.

The system further includes:
- means of storage, while the vehicle is stopped, of an outside air temperature value, a temperature value of the first element, and a temperature value of the member;
- a second module capable of calculating a stoppage period of the vehicle according to an outside air temperature value, a stored temperature of the first element and a measured temperature of the first element;
- a third module, capable of calculating a thermal history of temperature variation of the member while the vehicle is stopped, according to an outside air temperature value, a stored temperature of the member and a stoppage period of the vehicle calculated by the second module.

Advantageously, the third module is configured for calculating the change in temperature of the member during a preset period after the vehicle is stopped, then for switching off until another vehicle start-up.

According to a preferred embodiment, the third module is configured for assigning to the estimated temperature of the member when the vehicle is restarted, the last temperature value calculated for the member before the third module is switched off, if the stoppage period of the vehicle that the second module transmits to it is less than or equal to the preset period.

The second and third modules respectively can calculate the stoppage period and the temperature history at the stoppage of the member, or its last temperature on stopping, respectively by performing a heat balance on the exchanges between the first element and the air outside the vehicle, or respectively by performing a heat balance on the exchanges between the member and the air outside the vehicle.

Preferably, the second and third modules use exponential profiles of variation, with respect to time, of the difference of a temperature with respect to the temperature outside the vehicle, for estimating the stoppage period or for estimating the extent of a temperature variation.

The system may include one or more first modules capable of calculating one or more internal temperatures of a coupler transferring the torque of one set of wheels of the vehicle to another set of wheels of the vehicle, and comprise one or more third modules capable of calculating one or more internal temperatures of the coupler after an indeterminate stoppage period of the vehicle.

According to an advantageous embodiment, each estimated temperature value is associated with a Boolean validity indicator and a default temperature value, which replaces the estimated value if the Boolean indicator takes a preset value.

Preferably, the first element is cooling liquid present in the vicinity of the engine.

According to another aspect, an internal combustion engine vehicle is equipped with the preceding system for estimating the temperature of a mechanical member after the vehicle is stopped, and is equipped with a module for estimating the temperature outside the vehicle connected to an engine intake air temperature sensor, to an engine cooling liquid temperature sensor, and to a means for estimating the speed of the vehicle.

According to a third aspect, a method for estimating the temperature of a mechanical member of a combustion engine vehicle after the vehicle is stopped, includes the following steps:

when the vehicle stops, a last measured temperature of the vehicle's cooling liquid, a last measured or estimated temperature of air outside the vehicle, a last estimated temperature of the member, are written to read-only memories;

when the vehicle is restarted, the vehicle's cooling liquid temperature is measured, and from this temperature and the three preceding stored temperatures, a new temperature of the member is deduced, this new temperature of the member is used as an initial temperature for a subsequent estimate of the temperature of the member while the vehicle is traveling.

Advantageously, the relationship that connects the last measured or estimated outside air temperature $T_a$, the last estimated temperature of the member $T_{max}$, the last temperature $T_0$ measured at the same moment for the vehicle's cooling liquid, the temperature $T_1$ of the cooling liquid at start-up, and the new temperature of the member $T_{ini}$, is an exponential relationship of the form:

$$\frac{T_o - T_a}{T_1 - \tau_a} = \left(\frac{T_{ini} - T_a}{T_{max} - T_a}\right)^A,$$

where A is a positive real value.

BRIEF DESCRIPTION OF THE DRAWINGS

Other objects, advantages and characteristics of the invention will become apparent on scrutiny of the detailed disclosure of some embodiments given as non-restrictive examples and illustrated in the accompanying drawings, in which:

FIG. 3, with the aid of measured and estimated temperature curves, illustrates the principle of determining an initial coupler temperature according to the invention.

DETAILED DESCRIPTION

Figure 1:
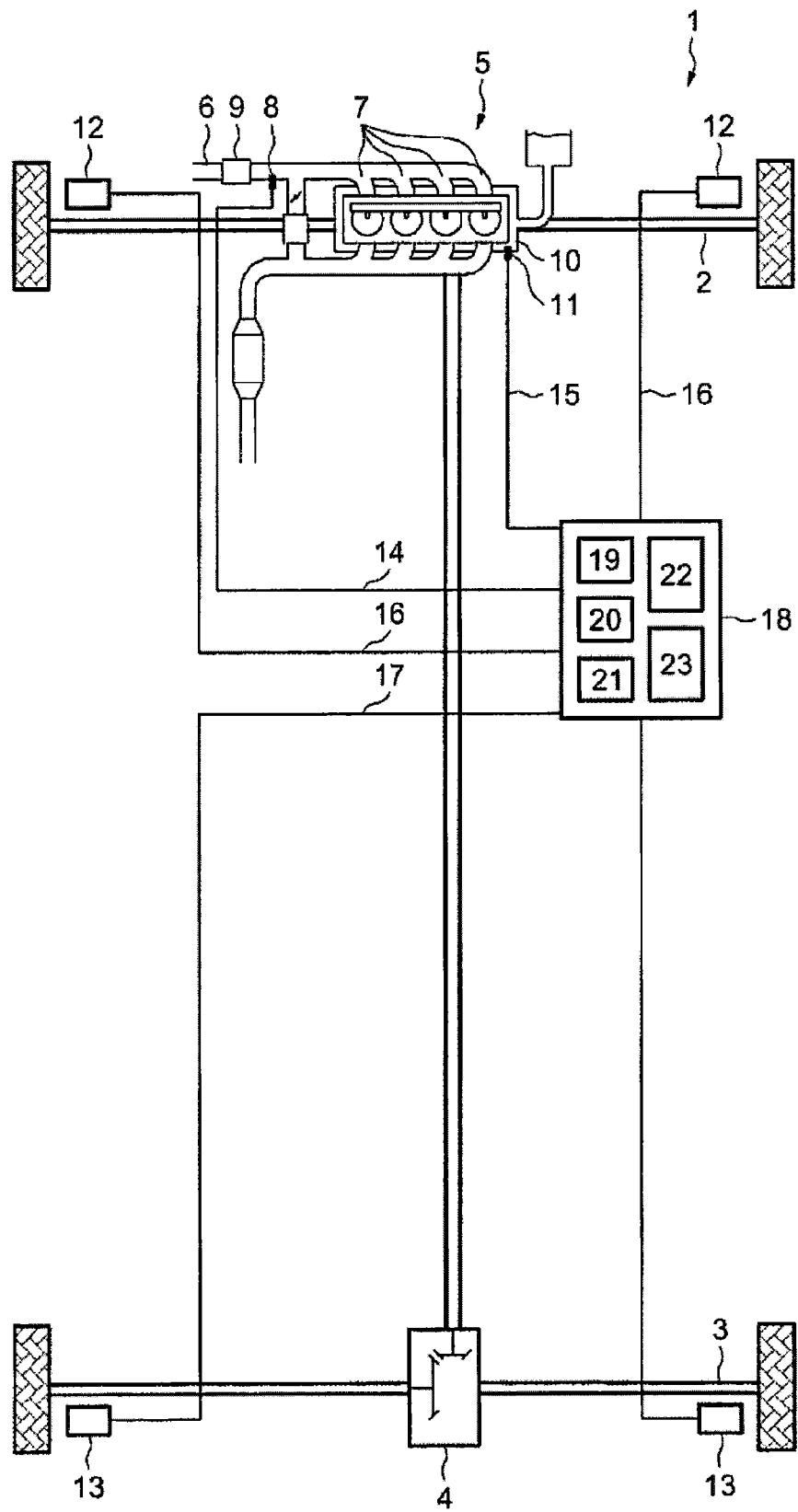
FIG. 1 illustrates a four-wheel drive vehicle equipped with a system for estimating the temperature of a coupler according to the invention.

As illustrated in FIG. 1, a vehicle 1 includes a front set of wheels 2 and a rear set of wheels 3, the front set 2 and rear set 3 being connected by a coupler 4 capable of being completely or partly joined together in rotation with the front axle 2 and rear axle 3. Each of the wheels of the front set 2 is fitted with a rotational speed sensor 12 and each of the wheels of the rear set 3 is fitted with a rotational speed sensor 13. The values recorded by the sensors 12 and 13 are used notably to calculate the difference in rotational speed between the front axle 2 and the rear axle 3, together with the instantaneous speed of the vehicle 1. Such sensors are generally present on the four wheels of a four-wheel drive vehicle, or more generally on the four wheels of vehicles equipped with a traction control system of the ABS type, or of a trajectory correction system of the ESP type.

The front axle 2 is connected via a power train system (not shown) to an internal combustion engine 5, notably including an air inlet 6, leading fresh air through an air filter 9 to cylinders 7 of the engine. The engine 5 is equipped with a cooling circuit 10. A temperature sensor 8 is arranged at the air inlet circuit 6, between the air filter 9 and the inlet of the cylinders 7. A temperature sensor 11 is arranged in the vicinity of the engine 5 in contact with the liquid of the cooling circuit 10. The wheel speed sensors 12 and 13, and the temperature sensors 8 and 11 are respectively connected by connections 16, 17, 14, 15 to an electronic control unit 18. The electronic control unit (ECU) 18 notably includes a module 19 for estimating the temperature of air outside the vehicle, a module 20 for estimating the time elapsed since the last use of the vehicle, and a module 21 for estimating the temperature of the coupler 4 at the end of the stoppage of the vehicle. The ECU 18 further includes storage means 22 connected to the three preceding modules 19, 20, 21, enabling the ECU 18 to write to read-only memories certain values from calculations or measurements which it has in random access memory just before the engine 5 is switched off, or just before the ECU 18 itself is switched off.

The module 20 is connected via the connection 15 to the cooling liquid temperature sensor 11, as well as to modules 19 and 21.

The module 19 is connected via connections 16 and 17 to the wheel speed sensors 12 and 13, via connections 14 and 15 to the two temperature sensors 8 and 11. Alternatively, the module 19 can be simply connected to a temperature sensor for air outside the vehicle. In the first case, the module 19 may, for example, use the values measured by sensors 8 and 11, of the engine intake air temperature and the cooling liquid temperature, for determining a probable initial temperature of the air outside the vehicle. The module can then determine the estimated variations in outside air temperature by performing mathematical filtering on the temperature measured by the sensor 8 of the engine intake air temperature, this filtering being designed to limit the estimated outside temperature gradients, by imposing two different maximum gradient values according to whether the instantaneous speed of the vehicle is higher or lower than a threshold value. The instantaneous speed of the vehicle can be deduced by the module 19 from the values of the instantaneous rotational speeds of the wheels, provided by the two sensors 12 and by the two sensors 13.

The ECU 18 also includes a module 23 for calculating the temperature of the coupler 4, when the vehicle is traveling. This temperature of the coupler 4 is, for example, calculated by performing a heat balance, taking into account the energy generated by friction in the coupler, based on the difference in rotational speed between the front axle 2 and the rear axle 3, and the energy given up to the air flowing around the coupler.

When the vehicle's engine has been stopped and the dashboard ignition has been switched off, the ECU 18 writes to one of the memory storage means 22, the last estimated temperature value of the coupler 4 during its operation calculated by the module 23. It also writes to another memory means 22, the last temperature estimated by the module 19 (or, in other variant embodiments of the invention, the last measured value of air outside the vehicle). Finally it writes, to a third read-only memory, the last value measured by the sensor 11, of the cooling liquid temperature.

After the ignition is switched off, the electronic control unit 18 remains active during a preset period, in order to better take into account a possible vehicle restart in quick succession. This preset period may be, for example, a few minutes to a few tens of minutes, according to the compromise that is to be chosen, between the reactivity of the vehicle control system during a warm restart, and the power consumption caused by the standby mode. During this preset period, the electronic control unit may possibly calculate, at regular time intervals, the temperature of the coupler 4, by taking into account its last temperature at the moment the engine is switched off, and by taking into account the heat exchanges with the outside air during the preset standby period of the electronic control unit.

In addition to the estimated temperature of the coupler 4 at the moment the engine is switched off, the electronic control unit 18 can write to memory means 22, the estimated temperature of the coupler 4 just before an electronic control unit 18 is finally switched off. The preset standby period of the electronic control unit is also recorded as a calculation parameter in a read-only, writable or non-rewritable memory of the electronic control unit 18. When the electronic control unit 18 is powered up again for restarting the vehicle, the module 20 for estimating the time elapsed since the last use of the vehicle records a current value of the cooling liquid temperature, which is provided by the sensor 11. The module 20 also accesses the last cooling liquid temperature value recorded in the storage means 22, as well as the last temperature of the air outside the vehicle recorded in the storage means 22.

For calculating the time elapsed since the engine has been switched off, the module 20 uses a first-order model representing the heat exchanges between the cooling liquid and the air outside the vehicle, assuming that there is a global exchange coefficient $C_{liq}$ enabling the following equation to be written:

$$\frac{dT_{liq}}{dt} = -\frac{(T_{liq} - T_a)}{C_{liq}} \quad \text{(equation 1)}$$

where:

$T_{liq}$ is the cooling liquid temperature, $\frac{dT_{liq}}{dt}$ is the derivative of this cooling liquid temperature with respect to time, $T_a$ is the air temperature outside the vehicle, and $C_{liq}$ is a coefficient of exchange between the cooling liquid and the parts of the engine in thermal contact with this liquid and the air outside the vehicle.

The elapsed period between the two cooling liquid temperature measurements can therefore be written:

$$\Delta t = C_{liq} \ln\left(\frac{T_0 - T_a}{T_1 - T_a}\right) \quad \text{(equation 2)}$$

where $\Delta t$ is the time interval separating the first temperature measurement, of result $T_0$ and the second temperature measurement, of result $T_1$ of the cooling liquid;

$T_a$ is the air temperature outside the vehicle, and $C_{liq}$ is a constant representing the global exchange coefficient between the engine and the cooling liquid and the air outside the vehicle.

In the case where the result of the calculation of $\Delta t$ is less than a value $\Delta t_{extinct}$ representing the preset standby period of the electronic control unit, the module 20 will interpret it that the period of the electronic control unit 18 being switched off is reduced to zero, i.e. the module 20 will consider that the vehicle has been restarted just after the electronic control unit 18 has been switched off.

Once the elapsed time estimation module 20 has determined the stoppage period of the vehicle, the module 20 transmits to the module 21 at least one value expressing this stoppage time. To this end it may transmit either the value $\Delta t$ separating the last instant that the engine was switched off and the instant it is restarted, or the value $\Delta t_{mission}$ representing the period separating the complete switching off of the electronic control unit and the new restarting of the engine, the two periods being connected by the relationship:

$$\Delta t = \Delta t_{extinct} + \Delta t_{mission} \quad \text{(equation 3)}$$

where $\Delta t_{extinct}$ represents the preset standby period of the electronic control unit 18 after the engine is stopped 5.

Once the module 21 has the time interval separating the last stoppage and restarting of the engine, it will read in the storage means 22 the last temperature recorded as the temperature of the air outside the vehicle $T_a$ and it will read a last recorded value of estimated temperature of the coupler, which may be either a temperature $T_{max}$ of the coupler at the moment the engine is switched off, or a temperature $T_{coff}$ of the coupler calculated by the electronic control unit as being the temperature of the coupler at the moment the electronic control unit 18 is switched off.

The electronic control unit 18 then estimates the temperature $T_{ini}$ of the coupler at the moment the vehicle starts up by performing a heat balance of the exchanges of the coupler with the air outside the vehicle, between the last moment when the temperature of the coupler was calculated, and the moment when the cooling liquid temperature $T_1$ at the moment the engine starts up, is measured again.

It is again assumed that there is a global exchange coefficient $C_2$ between the coupler and the air outside the vehicle, so that the electronic control unit 18 may, for example, estimate the temperature of the coupler $T_{ini}$ at the moment of restarting according to one of the following equations:

$$T_{ini} = T_a + (T_{max} - T_a)\exp\left(-\frac{\Delta t}{C_2}\right) \quad \text{(equation 4)}$$

or $$T_{ini} = T_a + (T_{coff} - T_a)\exp\left(-\frac{\Delta t_{mission}}{C_2}\right) \quad \text{(equation 5)}$$

Once the module 21 for estimating the temperature of restarting of the coupler has calculated the new value $T_{ini}$, it can transmit this value to the module 23 which continues to evaluate the temperature of the coupler while the vehicle is traveling.

Figure 2:
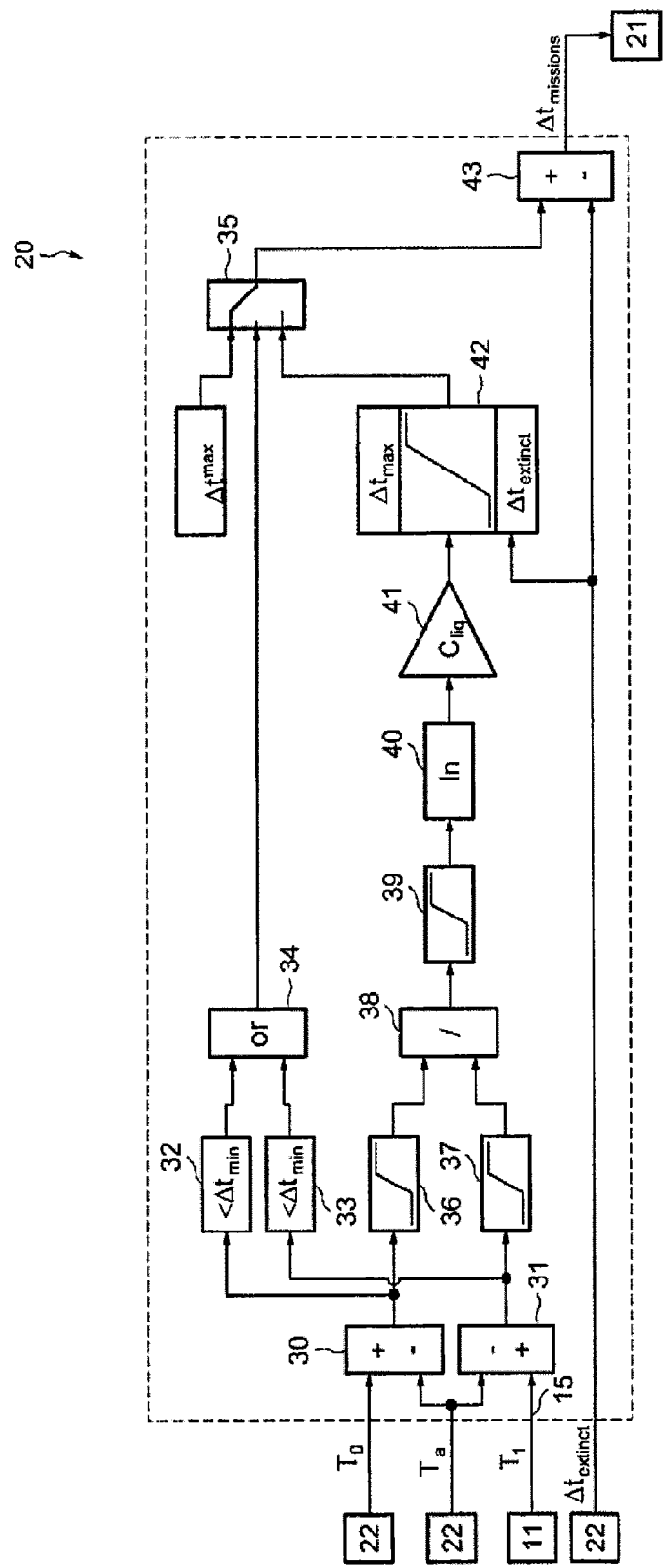
FIG. 2 illustrates a possible mode of operation of a module for estimating vehicle stoppage time between two journeys.

FIG. 2 illustrates a possible embodiment of the module 20 for estimating the time elapsed since the last powering down of the vehicle monitoring systems. Some elements found in FIG. 2 are common to FIG. 1, the same elements then being designated by the same references. The module 20 will read in the storage means 22 a temperature $T_0$ which is the last cooling liquid temperature stored before the system is switched off, and a temperature $T_a$ which is a last temperature of the air outside the vehicle stored before the system is switched off. It then sends these two values to a subtractor 30 which calculates the absolute value of the difference between the two temperatures and sends it to a comparator 32 that performs a test for ascertaining whether the difference is less in absolute value than a parameter $\Delta t_{min}$.

Via the connections 15, the module 20 receives a cooling liquid temperature $T_1$ measured at the moment the engine is restarted. A subtractor 31 calculates the absolute value of the difference between this temperature $T_1$ and the temperature $T_a$ stored as a temperature of the air outside the vehicle. This difference is sent to a comparator 33 which looks to see whether it is less than a parameter of minimum duration $\Delta t_{min}$. The comparators 32 and 33 send their result to a Boolean "OR" operator 34, which sends its result to the control input of a three-way switch 35. The result of the operator 34 is, for example, 1 if at least one of two differences in absolute value is less than the $\Delta t_{min}$ parameters, and otherwise is zero. The differences calculated by the subtractors 30 and 31 are then respectively thresholded by the thresholding operators 36 and 37. A divisor 38 then produces the quotient of the differences $T_0 - T_a$ and $T_1 - T_a$. The quotient is then sent to another thresholding operator 39. A logarithmic converter 40 then calculates the logarithm of the result of the operator 39 and transmits it to a multiplier 41 which multiplies it by a value $C_{liq}$. Another thresholding operator 42 performs a thresholding of the result so that it is between a value $\Delta t_{extinct}$ and the parameter $\Delta t_{max}$. The value $\Delta t_{extinct}$ used by the thresholding operator 42 may be either a fixed parameter, written to a rewritable or non-rewritable memory, or may be a variable parameter written each time the system is switched off, to the storage means 22. The result of the operator 42 is sent to the negative input of the switch 35, which receives the value of the parameter $\Delta t_{max}$ at its positive input. According to the results of the Boolean operator 34, the output of the switch 35 takes the value $\Delta t_{max}$, if one of the temperature differences calculated by the operators 30 and 31 is less than the threshold $\Delta t_{min}$, or otherwise takes the value calculated by the operator 42. The value $\Delta t_{extinct}$ corresponding to the electronic control unit 18 standby period can then be subtracted from the result leaving the switch 35, for obtaining a period $\Delta t_{mission}$, corresponding to the period that has elapsed between the electronic control unit 18 being switched off, and the vehicle being restarted. This value $\Delta t_{mission}$ is then sent to the module 21 which uses it for estimating the new temperature of the coupler 4.

With the aid of temperature curves FIG. 3 illustrates the principle used in the invention for calculating the temperature $T_{ini}$ of the coupler when the vehicle is restarted. Notations common to the previous figures are found in FIG. 3, the same notations representing the same variables. On the abscissa axis, graduated in hours, three instants are shown of a stop-restart sequence of the engine 5 from FIG. 1 which are:

A: the moment the engine is switched off,

B: the moment the electronic control unit 18 is switched off,

C: the moment the vehicle is restarted.

Three temperature curves 50, 51 and 52 are shown in the figure.

Curve 52 shows the estimated temperature of the air outside the vehicle. It is shown in the form of a curve of constant value $T_a$, since over the time intervals prior to A and subsequent to C, the outside air temperature is estimated with temporal filtering which tends to reduce these variations; over the time interval AC, there is no estimation of outside air temperature, so it is considered that the temperature remains constant, equal to the last value $T_a$ stored in the means 22 at the moment the engine is switched off.

The temperature curve 50 shows the estimated temperature variations of the coupler 4, and breaks down into two portions 50a and 50c calculated by the module 23 while the engine is traveling, and a portion 50b calculated by the module 21 of the electronic control unit 18.

Curve 51 shows the temperature variations of the cooling liquid, and breaks down into two portions 51a and 51c corresponding to the time intervals prior to A and subsequent to C and a portion 51b corresponding to the time interval AC. The curve portions 51a and 51c result from measurements made by the temperature sensor 11, and the portion 51b is deduced from the calculation performed by the elapsed time estimation module 20.

At the moment the engine is switched off, i.e. at instant A, the value $T_{max}$ corresponding to the temperature of the coupler being switched off at point 53 of curve 50, and the value $T_0$ corresponding to the measured cooling liquid temperature at point 56 of curve 51, are stored in the storage means 22. The value $T_a$ of temperature outside the vehicle, estimated by the module 19 at this same instant, is also stored in the means 22. At the moment the engine is switched on again, i.e. at instant C, the temperature sensor 11 gives the temperature $T_1$ corresponding to point 58 at which the temperature $T_1$ is known, but not the temporal coordinate. From the values $T_0$ and $T_a$ the elapsed time estimation module 20 is able to plot curve portion 51b starting from point 56, and find the point where this curve passes through an ordinate of temperature $T_1$, corresponding to the new liquid temperature measured by the sensors 11. The module 20 deduces the abscissa of point 58 from this and transmits it to the module 21, either by specifying a value $\Delta t_{mission}$ representing the time that has elapsed since the electronic control unit 18 was switched off, or by specifying the sum $\Delta t = \Delta t_{extinct} + \Delta t_{mission}$ of the elapsed times over the time intervals AB and BC since the engine was switched off.

The module 21, at the moment the engine is restarted, will search in the storage means for the values $T_{max}$ and $T_a$ corresponding to the values stored for the last temperature of the coupler and for the last outside air temperature, and is able, from these two values, to deduce portion 50b of curve 50 giving the cooling history of the coupler 4 starting from point 53. By searching for point 55 where this curve passes through the time abscissa C that module 20 has transmitted to it, the module 21 may deduce the value $T_{ini}$ of the coupler 4 at the moment the vehicle starts up.

Even if the module 21 only provides, for the needs of controlling the coupler, the temperature of the coupler at point 55, corresponding to the moment of the vehicle being restarted, the module 21 is able to calculate the entire cooling history corresponding to portion 50b of curve 50. In fact, for ascertaining the temperature of the coupler at any instant of the time interval AC, it would suffice to provide module 21 with any time interval separating instant A and another instant prior to C, instead of the time interval AC corresponding to restarting the vehicle.

According to variant embodiments, it may happen that the time interval provided by the module 20 is less than or equal to $\Delta t_{extinct}$. In this case, the module 21 considers that the stoppage period is exactly equal to $\Delta t_{extinct}$. The module 21 then provides the temperature value corresponding to point 54, which gives the temperature of the coupler at the moment the electronic control unit 18 is switched off. According to variant embodiments, the temperature value corresponding to point 54 may be stored at the moment the electronic control unit 18 is switched off, or may be recalculated after the event, only if it is decided that it is needed as the temperature of the coupler when the vehicle is restarted. If the temperature of point 54 is stored before the electronic control unit 18 is switched off, the module 21 may use it for calculating the temperature $T_{ini}$, without reusing the value $T_{max}$ calculated at the moment the engine is switched off.

Variant embodiments are conceivable where the cooling liquid temperature continues to be recorded after some of the engine functions are switched off, until the electronic control unit is switched off, so that the temperature value corresponding to point 57 of curve 51 is recorded in the memory means 22.

At the moment the vehicle is restarted, the module 20 then estimates the time interval $\Delta t_{mission}$ from the stored value $T_a$ of air and the temperature of point 57. This variant is more accurate since the temperature of point 57 is measured this time and not calculated. On the other hand, this method requires leaving some of the engine functions on standby, notably that associated with the management of the sensor 11.

The invention is not limited to the embodiments disclosed and may be the subject of numerous variants, notably with respect to the models used for calculating the cooling of the engine in contact with the cooling liquid, and for calculating the cooling of the coupler. The temperature of the air outside the vehicle may be measured by an outside air sensor. A choice may then be made, when the vehicle is restarted, to use either the air temperature at the moment of switching off, or the air temperature at the moment of restarting, or a weighted average of the two measured temperatures. Each measured or estimated temperature may be associated with a Boolean validity indicator which will indicate whether the information necessary for its calculation or its measurement is sufficiently reliable. A choice can then be made, when the Boolean indicator indicates a lack of reliability, either to retain, for the value in question, the last value it has taken with a positive Boolean indicator, or to impose an arbitrary default value on it.

The temperature estimation system according to the invention can be used to assign a temperature value to a mechanical member when a vehicle is restarted, by using the minimum of temperature sensors, the temperature sensors used further forming a part of the practically unavoidable sensors on an internal combustion engine vehicle. The estimation system according to the invention enables the electronic management system of the vehicle to be completely switched off while the vehicle is stopped. The system is not likely to cause overheating of the dissipative members, which would be caused by too low an arbitrary initialization of the estimated temperatures of these members. The system is economical, robust and safe for the members for which it is used.

The invention claimed is:

1. A system for estimating temperature of a mechanical member of a vehicle after the vehicle is stopped, comprising:
   a temperature sensor of a first element of the vehicle; a means of estimating temperature of air outside the vehicle; a first module estimating temperature of the member while the vehicle is traveling;
   a means of storing, while the vehicle is stopped, of an outside air temperature value, a temperature value of the first element, and a temperature value of the member;
   a second module configured to estimate a stoppage period of the vehicle based on the outside air temperature value, the stored temperature of the first element, and a measured temperature of the first element; and
   a third module configured to estimate a continuous thermal history of temperature variation of the member for all points in time while the vehicle is stopped, based on the outside air temperature value, the stored temperature of the member, and the stoppage period of the vehicle estimated by the second module;
   wherein the third module is configured to calculate a change in temperature of the member during a preset period after the vehicle is stopped, then to switch off until another vehicle start-up.

2. The temperature estimation system as claimed in claim 1, wherein the third module is configured to assign to the estimated temperature of the member when the vehicle is restarted, a last temperature value calculated for the member before the third module is switched off, if the stoppage period of the vehicle that the second module transmits to it is less than or equal to the preset period.

3. The temperature estimation system as claimed in claim 1, wherein the second and third modules respectively estimate the stoppage period and the temperature history at the stoppage of the member, or its last temperature on stopping, respectively by performing a heat balance on exchanges between the first element and the air outside the vehicle, or respectively by performing a heat balance on exchanges between the member and the air outside the vehicle.

4. The temperature estimation system as claimed in claim 1, wherein the second and third modules use exponential profiles of variation, with respect to time, of the difference of a temperature with respect to the temperature outside the vehicle, for estimating the stoppage period or for estimating an extent of a temperature variation.

5. The temperature estimation system as claimed in claim 1, wherein the first module is configured to estimate one or more internal temperatures of a coupler transferring torque of one set of wheels of the vehicle to another set of wheels of the vehicle, and the third module is configured to estimate one or more internal temperatures of the coupler after an indeterminate stoppage period of the vehicle.

6. The temperature estimation system as claimed in claim 1, wherein each estimated temperature value is associated with a Boolean validity indicator and a default temperature value, which replaces the estimated value if the Boolean indicator takes a preset value.

7. The temperature estimation system as claimed in claim 1, wherein the first element is cooling liquid present in a vicinity of the engine.

8. An internal combustion engine vehicle comprising:
   a temperature sensor of a first element of the vehicle;
   a means of estimating temperature of air outside the vehicle;
   a first module estimating temperature of the member while the vehicle is traveling;
   a means of storing, while the vehicle is stopped, of an outside air temperature value, a temperature value of the first element, and a temperature value of the member;
   a second module configured to estimate a stoppage period of the vehicle based on the outside air temperature value, the stored temperature of the first element, and a measured temperature of the first element; and
   a third module configured to estimate a continuous thermal history of temperature variation of the member for all points in time while the vehicle is stopped, based on the outside air temperature value, the stored temperature of the member, and the stoppage period of the vehicle estimated by the second module;
   wherein the third module is configured to calculate a change in temperature of the member during a preset period after the vehicle is stopped, then to switch off until another vehicle start-up, and
   wherein the means of estimating the temperature outside the vehicle is connected to an engine intake air temperature sensor of the vehicle, to an engine cooling liquid temperature sensor, and to a means for estimating speed of the vehicle.

9. A method of estimating temperature of a mechanical member of a combustion engine vehicle after the vehicle is stopped, comprising:
   writing to memories when the vehicle stops, a last measured temperature of the vehicle's cooling liquid, a last measured or estimated temperature of air outside the vehicle, and a last estimated temperature of the member;

estimating a continuous thermal history of temperature variation of the member for all points in time while the vehicle is stopped, based on the temperatures stored in the memories, including the last cooling liquid temperature, the last outside air temperature, and the last temperature of the member;

measuring the vehicle's cooling liquid temperature when the vehicle is restarted and deducing a new temperature of the member based on this temperature and the estimated thermal history; and utilizing this new temperature of the member is used as an initial temperature for a subsequent estimate of the temperature of the member while the vehicle is traveling.

10. The temperature estimation method as claimed in claim 9, wherein a relationship that connects the last measured or estimated outside air temperature $T_a$, the last estimated temperature of the member $T_{max}$, the last temperature $T_0$ measured at the same moment for the vehicle's cooling liquid, the temperature $T_1$ of the cooling liquid at the start-up, and the new temperature of the member $T_{ini}$, is an exponential relationship of form:

$$\frac{T_o - T_a}{T_1 - T_a} = \left(\frac{T_{ini} - T_a}{T_{max} - T_a}\right)^A,$$

where A is a positive real value.

11. The temperature estimation system as claimed in claim 1, wherein the first element is a fluid tank.

12. The temperature estimation system as claimed in claim 1, wherein the first module, the second module, and the third module are comprised in an electronic control unit.

13. The temperature estimation system as claimed in claim 1, wherein the storing means includes one or more memories.

14. The temperature estimation system as claimed in claim 1, further comprising:
  one or more additional first modules configured to estimate one or more internal temperatures of a coupler transferring torque of one set of wheels of the vehicle to another set of wheels of the vehicle; and
  one or more additional third modules configured to estimate one or more internal temperatures of the coupler after an indeterminate stoppage period of the vehicle.

* * * * *